United States Patent [19]

Caul et al.

[11] Patent Number: 4,588,419
[45] Date of Patent: May 13, 1986

[54] RESIN SYSTEMS FOR HIGH ENERGY ELECTRON CURABLE RESIN COATED WEBS

[75] Inventors: Lawrence D. Caul, Buffalo; Paul F. Forsyth, Niagara Falls, both of N.Y.

[73] Assignee: Carborundum Abrasives Company, Niagara Falls, N.Y.

[21] Appl. No.: 686,250

[22] Filed: Feb. 8, 1985

Related U.S. Application Data

[60] Continuation-in-part of Ser. No. 617,686, Jun. 6, 1984, Pat. No. 4,547,204, which is a division of Ser. No. 195,030, Oct. 8, 1980, Pat. No. 4,457,766.

[51] Int. Cl.⁴ .............................................. B24D 11/00
[52] U.S. Cl. ......................................... 51/295; 51/298; 427/44
[58] Field of Search ................... 51/295, 298; 427/44

[56] References Cited

U.S. PATENT DOCUMENTS

| | | | |
|---|---|---|---|
| 3,942,959 | 3/1976 | Marköö et al. | 51/298 |
| 3,997,302 | 12/1976 | Supkis | 51/298 |
| 4,047,903 | 9/1977 | Hesse et al. | 51/295 |
| 4,163,647 | 8/1979 | Swiatek | 51/298 |
| 4,457,766 | 7/1984 | Caul | 51/298 |

*Primary Examiner*—Paul Lieberman
*Assistant Examiner*—Willie J. Thompson
*Attorney, Agent, or Firm*—Donald C. Studley; Michael L. Dunn

[57] ABSTRACT

Abrasive products and methods of producing such products are described. The resin systems utilized are particularly suited to use in the manufacture of coated adhesive products. The coated abrasive products have a plurality of resin layers. The products have at least one layer comprised of an electron curable resin and at least one layer comprised of a heat curable resin. The products may include both electron and heat curable resins combined in a single layer.

19 Claims, 2 Drawing Figures

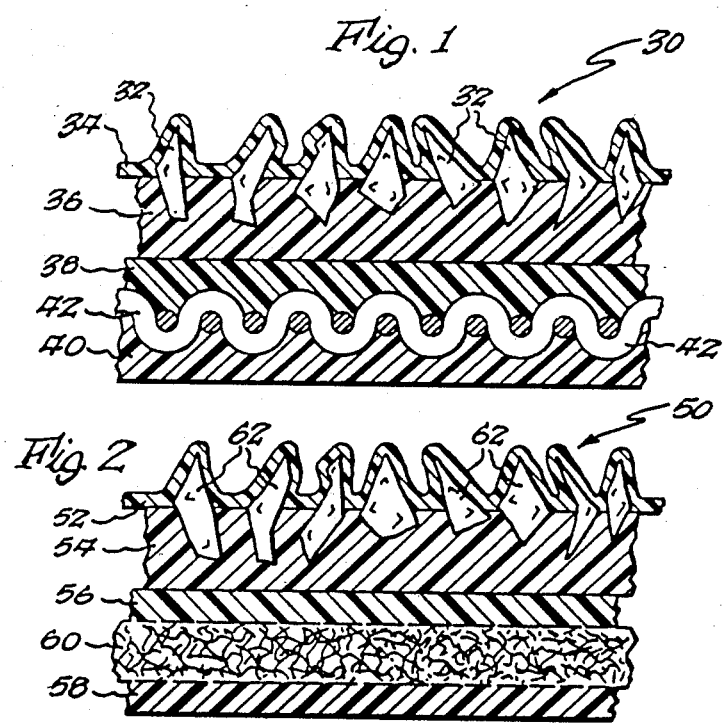

RESIN SYSTEMS FOR HIGH ENERGY ELECTRON CURABLE RESIN COATED WEBS

REFERENCE TO PRIOR APPLICATIONS

The present application is a continuation-in-part of U.S. Ser. No. 617,686, filed June 6, 1984, now U.S. Pat. No. 4,547,204, which in turn, is a divisional application of U.S. Ser. No. 195,030, filed Oct. 8, 1980, now U.S. Pat. No. 4,457,766.

BACKGROUND OF THE INVENTION

1. Field of the Invention

The invention relates to coated abrasives and specifically to coated abrasive products. More in particular, the invention relates to coated abrasive products and methods of making the products, and to the use of resin coatings on webs of cloth or paper to produce an article of commerce which may be subsequently useful to produce coated abrasive materials.

2. Prior Practices

It is well known in the coated abrasive art to apply a resinous binder and abrasive grains to a paper or cloth substrate and cure the binder to produce a coated abrasive product. Typically an overcoat is applied over the grain carrying layer and, in turn, cured. Examples of suitable binders are glutelin glue and phenolic resins. If water-proof products are desired, polyurethane resins, epoxy resins and alkyd resins, possibly in combination with melamine resins are typically used. Special techniques and apparatus are necessary for the lengthy curing process. To avoid destruction of the fibrous substrates, usually consisting of polyester or cellulose, curing is carried out at a maximum temperature of 120° to 130° C. Rapid curing which would allow the use of horizontal dryer, is not generally employed because gas bubbles form in the resin which adversely affect the adhesion of the resin on the substrate. Curing of the coated material usually requires one or more hours, and is therefore conveniently carried out in a loop dryer. The loop dryers through which the coated web material is passed, enable a long curing process, but there are also disadvantages, such as defects which may be formed in the areas of the material where it is suspended, sagging of the binder, and changing of the grain position due to the vertical suspension. Also variations in temperature in the loop dryer produced by the necessary slow air circulation can cause inconsistent or incomplete drying or curing of the binder material.

In addition, there are several other disadvantages in the present commercial practice of forming coated abrasives. For example, numerous separate curing steps are required in the typical process for the production of cloth or paper-backed abrasives. Generally, the substrate is initially treated to prepare a base for application of abrasives. Subsequently, coated abrasive materials are produced using the base. The base, e.g., cloth, is usually coated with at least one back coat of resin which impregnates the cloth with resin and fills the interstices in the back of the cloth. The base cloth is also typically coated with at least one face coat to fill interstices of the cloth on the face side. Subsequently, a make coat is applied over the base coat, the abrasive grain added and a size coat or an overcoat, applied.

As discussed above the drying, or curing, of the various coats is generally carried out in a loop dryer. Such driers require a substantial amount of floor space and have high energy requirements. In addition, the temperature in large dryers is difficult, at best, to control. Further, there is a problem of resin and grain shifting positions during curing because of the long hang times required.

It has been suggested in U.S. Pat. No. 4,047,903, Hease et al, that waterproof abrasives be produced using resins cured by an electron beam. However, there has remained a need for viable methods, formulations, and apparatus which would allow the commercialization of coated abrasive products produced by electron beam curing.

In the production of conventionally coated abrasive products, relatively thick coats of resin are utilized, as compared with the thickness generally used in electron beam curing. The relatively thick coats create handling problems as the resins do not rapidly cure and tend to remain sticky for a substantial period of time prior to being completely cured.

The present invention provides for the use of combinations of electron radiation curable resin systems and conventional heat curable resin systems. The combinations provide many of the advantages of systems employing solely electron radiation curable resins while utilizing more economical mixtures which include conventional heat curable resins. The hybrid mixtures of the present invention in which an electron radiation curable resin system and a conventional heat curable resin system are combined in a single coat, are particularly useful. Such mixtures are applied to a substrate and processed to cure the electron radiation curable resin portion. The resultant product is a combination of cured electron radiation curable resin and partially cured heat curable resin. The product, typically slightly tacky, is sufficiently nonadherent that it may be rolled and stored, or may be used for continued processing, without completely curing the heat curable resin component. Various layers of hybrid mixtures may be successively applied without completely curing the heat curable portions of the layers. The incompletely cured heat curable resins suitably are cured in a single, typically final, heat curing step.

The present invention provides a good quality coated abrasive product in a low-cost, commercially satisfactory manner.

BRIEF DESCRIPTION OF THE INVENTION

It is an object of this invention to overcome disadvantages of the prior methods for forming resin coated webs of paper and cloth.

It is a further object of this invention to overcome disadvantages of the prior methods for forming coated abrasive products.

It is an additional object of this invention to provide mixtures of electron beam curable and heat curable resins suitable for back coats on cloth for the subsequent production use of coated abrasive products.

It is another object of this invention to provide improved face coats on cloth for use in coated abrasive process utilizing electron beam curable and heat curable resin systems.

It is a further object of this invention to provide improved make coats adapted for use in electron beam and in heat curing processes.

It is an additional object of the invention to provide improved, continuous, uniform coatings of backing materials used for coated abrasive products.

It is an additional object of this invention to provide electron beam curing resin and heat curable resin system having improved adhesion to backing materials.

It is a further object of the invention to provide improved resin systems for electron beam curing and heat curing of the size coat on coated abrasive materials.

It is another object of this invention to provide resin systems suitable for the continuous coating and abrasive grain application to webs in apparatus adapted to electron beam curing.

These and other objects of the invention are generally accomplished by providing improved resin compositions which are particularly suited to utilization in electron beam curing processes. The resin systems of the instant invention are particularly suited for the coating of cloth used as the base of coated abrasive materials. The treated base cloth product is useful for immediate processing into a coated abrasive product by the application of abrasive grain, or it may be stored for later use, or it can be sold as waterproof stretch resistant cloth adapted to the production of coated abrasive materials.

The invention also encompasses electron radiation or beam curable resin systems and conventional heat curable resin systems which are particularly adapted for use in forming coated abrasive products having a plurality of layers or coatings; for example, base, make and size coats. The make coat is the resin coat onto which the abrasive grain is deposited. The make coat must hold the grain in the resin while the product is flexed numerous times without the coat becoming dislodged from the base cloth, or the grain becoming dislodged from the resin layer. The size coat is the coat which is placed over the abrasive grain to aid in holding the grain onto the substrate during flexing or in grinding operations.

It is within the scope of the present invention to utilize various combinations of electron radiation curable resin systems with conventional heat curable resin systems. For instance, the back and face coats of a cloth substrate could be formed using electron beam curable resin, and then the make and size coats formed utilizing conventional heat curable resin systems. Thus, the electron beam curing resin systems of the present invention are compatible with, and may be utilized in various combinations with conventional heat curable resins. For example, the face coat may be formed by an electron beam curable resin, while the back coat may be of a conventional heat curable resin. Various combinations of the various coats may be simply and easily produced using the resin systems of the present invention. Further, the resin systems may be combined in the formation of a single layer. Thus, the face, back, make or size coats may be separately formed of hybrid resin systems, that is, mixtures of electron beam and heat curable resins. The present resin systems allows the producer a versatility to produce coated abrasive products having better flexibility, better adherence of the particles and less flaking or layer separation.

The composition of the various layers may be interchanged between electron beam curable, conventional heat curable, or hybrid resin systems. However, the application of a layer of an electron beam curable resin or a hybrid resin directly over a layer of heat cured resin, such as a cured or partially cured phenolic layer, results in unsatisfactory adhesion of the layers.

The present coated abrasive products have a plurality of layers or coatings, selected from electron curable resins, heat curable resins, or mixtures thereof. The plurality of coatings include at least one each of: a base, or face coat; a make coat and a size coat. In accord with the present invention at least one coating is comprised of an electron beam curable resin and at least one coating is comprised of a heat curable resin. Thus, one layer of a hybrid resin fulfills the foregoing requirement.

BRIEF DESCRIPTION OF THE DRAWINGS

FIG. 1 illustrates in cross-section a coated abrasive on a cloth backing material.

FIG. 2 is a cross-sectional view of a coated abrasive on a paper backing material.

DETAILED DESCRIPTION OF THE INVENTION

The resin systems of the invention may be utilized to form fibrous backed, usually cloth, or paper backed, resin treated sheet materials. The resin systems further may be used to provide resin-treated flexible webs of cloth or paper that may be sold to others for use in the manufacture of coated abrasive products.

Coated abrasives that may be produced by the resin systems of the invention are illustrated in FIGS. 1 and 2. As illustrated in FIG. 1, the coated abrasive generally indicated as 30 is cloth backed. Cloth 42 has been treated with a back coat 40 and a face coat 38. Overlaying the face coat is a make coat 36 in which are embedded abrasives 32 such as silicon carbide or aluminum oxide. A size coat 34 has been placed over the make coat 36 and the abrasive grains 32. There is no clear line of demarcation between the back coat and the face coat which meet in the interior of the cloth backing which is saturated as much as possible with the resins of these coats.

In FIG. 2 there is illustrated a coated abrasive generally indicated as 50 which is formed on a paper backing 60. Paper backing 60 is treated with a back coat 58 and face coat 56. The face coat is overcoated with a make coat 54 in which are embedded abrasive grains 62. The abrasive grains 62 and make coat 54 are overcoated with a size coat 52 which aids in holding the abrasive grains 62 onto the backing during utilization and further may contain cutting aids.

The order in which the back coat and face coat are placed onto the substrate may be varied, but generally the face coat is placed onto the substrate first. Each of the back coat, face coat, make coat and size coat may be entirely of electron-curable resins, a combination of layers of electron beam curable and conventional heat curable resins, on the separate layers may be comprised of mixtures of electron beam and heat curable resins, provided at least one layer or coating is comprised of an electron beam curable resin. It will be understood that a layer of hybrid resin (a mixture of electron beam and heat curable resins) will fulfill the latter requirement. Further, the back, front base coats, make and size coats may be overcoated with additional resin coatings, if desired, or required.

The electron radiation curable resin systems of the invention comprise an oligomer, a diluent, fillers and minor amounts of other additives, such as surfactants, pigments and suspending agents. The amounts and specific material are selected in each case to give the desired properties at the lowest cost for each coat.

The oligomers used in the electron radiation curable systems of the invention may be any reactive polymer which gives the desired properties to the backing material and to the coated abrasive product. Suitable electron-curable resins have been found to be the urethane-acrylates, and epoxy-acrylates. Particularly preferred among the acrylated epoxies are the diacrylate esters such as the diacrylate esters of biphenol A epoxy resin. Preferred urethanes are diacrylate esters of an hydroxy terminated NCO extended polyesters or polyethers. These resins have good strength properties and adhere well to both the base materials and the abrasive grain. The urethane-acrylates find best use in cloth treatment systems and in the make coat of coated abrasive products.

Diluents may be utilized to adjust the viscosity of the coating mixture to use various application methods, such as, knife coating, roll pressure coating, transfer rolls and doctor blades. Further, the diluents may be used to modify curing properties of the resin and the flexibility of both rhe resin material and that of the coated abrasive products. Any diluent suitable for advantageously modifying the properties of acrylated urethane or acrylated epoxy resins may be utilized in the invention. Among suitable diluents for the electron-curable resins are the vinyl pyrrolidones and the multifunctional and mono-functional acrylates. The preferred compounds are N-vinyl-2-pyrrolidone (NVP); 1, 6 hexanediol diacrylate (HDODA); tetraethylene glycol diacrylate (TTEGDA); and trimethylolpropane triacrylate (TMPTA). These materials, in addition to adjusting viscosity, modify flexibility and reduce radiation required for curing.

The resin systems of the invention also may contain filler materials which are suitably selected from any filler which does not harmfully affect the properties of the system, is low in cost and is able to be included in significant amounts in the system. Preferred fillers are calcium carbonate, aluminum silicate and alumina trihydrate. Such materials have been found to be usable in large amounts in the resin systems with retention of good property strengths and flexibility properties of the cured resin.

Among additives suitable for the resin systems of the instant invention are those designed to act as surfactants, pigments for colors and suspending agents. A preferred suspending agent has been found to be fumed silica, preferably in about 12 millimicron particle size, as such material gives good rheological properties. Any suitable dyes or pigments may be utilized to color the coated abrasive by the desired amount.

In the formulation of various layers or coats of electron radiation curable resin, the oligomer and diluent are frequently mixed in a ratio of about 50 to about 90% by weight oligomer to about 10 to about 50% by weight diluent. A preferred range of diluent has been found to be about 10 to about 30% by weight of the oligomer for desired flexibility and hardness. The amounts are selected to give a desired viscosity for the method of application to be utilized, and also to give the required flexibility and hardness.

The conventional heat curable resins useful in the present invention to form separate layers or as a component of the hybrid resin systems may be chosen from any heat curable resins compatible with the present electron beam resins. Examples of suitable heat curable resins are phenolic resins, melamine resins, amino resins, alkyd resins, and furan resins. Phenolic resins are usually preferred because of their availability, cost, and ease of handling. Further, such resins add a heat resistant property to the final coated abrasive product.

The hybrid resin systems useful in the present invention contain up to 50% by weight of heat curable resin. Mixtures containing from about 25 to about 40% by weight heat curable resin have been found to be particularly useful.

The amount of filler utilized in the electron beam curable system, or in the hybrid resin system is determined by the amount of resin and diluent utilized. Generally between about 30 and about 100 parts by weight of filler are utilized per 100 parts by weight of the resin and diluent system. The surfactant, suspending agent and pigments are generally used in very small amounts and at the minimum which is effective to give the colorant and dispersant properties desired.

The amount of face fill necessary for each substrate is best determined by looking to the properties desired in the final product. In the instance of 17 pound per ream polyester substrate, it has been found that between about 25 and about 60% of the fabric weight should be applied as a face fill coat. For the same 17 pound polyester fabric, a back fill of about 10 to about 30% by weight of the polyester has been found to be suitable to produce a filled cloth of excellent flexibility, wear and stretch resistance.

The amount of the make and size coats applied to the substrate is whatever is sufficient to hold the abrasive particles.

The methods of applying the coatings of the invention may be selected from those conventional in the coated abrasive art. Among typical methods are roll coating from a transfer roll and doctor blade coating. A preferred method has been found to be press roll or direct roll coating.

In the size coat, active fillers may be utilized that aid in cutting. Among such fillers are cryolite cutting aids which increase the life of the abrasive. Other typical cutting aids are potassium fluroborate, feldspar, sulfur and iron pyrites.

The amount of radiation from an electron radiation source utilized to cure the electron beam resin systems is selected to provide cure of the electron beam resin portion of the coating. First coats may not need complete cure. A cure of the back and face coats at 300 kilovolts for a 1 megarad dose usually provides sufficient cure with application of the radiation being made directly onto the wet surface. The make and size coats for the resin systems of the invention, usually about 20 mils thickness, have been found to be sufficiently cured at 500 kilovolts for a 5 megarads dose from either the face or through the backing. The total voltage requirement is regulated to vary the depth of penetration of the electron beam or other electron radiation source.

The resin systems of the instant invention may be utilized for coating with any suitable source of electron radiation and coating apparatus. A suitable apparatus is disclosed in copending and coassigned application entitled APPARATUS FOR ELECTRON CURING OF RESIN COATED WEBS, inventor Alton Miller, filed as Ser. No. 172,722 on July 28, 1980, now U.S. Pat. No. 4,345,545 issued Aug. 24, 1982, which is hereby incorporated herein by reference.

The following examples illustrate the formation of a coated abrasive in accordance with preferred forms of the instant invention. Parts and percentages are by weight unless otherwise indicated. A ream as utilized in the description and Examples is 480 sheets of 9 inches by 11 inches.

EXAMPLES

EXAMPLE 1

This Example will illustrate the formation of a coated abrasive utilizing the EB (electron beam) cured resins of the invention in each coat of the abrasive and backing material.

There is provided a sateen polyester cloth in a weave of 103×40. This means that there are 103 threads per inch in the running direction and 40 threads per inch in the crossing direction. The polyester had been heat treated to provide a fabric with very low shrink and stretch properties.

A face fill coating was applied to the cloth side with the predominance of fill threads. The face fill ingredients were as follows:

| CLASS | COMPOSITION | AMOUNT |
|---|---|---|
| Oligomer | Acrylated-urethane (Uvithane ® 783 Thikol Corporation) | 4064 grams |
| Diluent | N—vinyl-2-pyrrolidone | 3800 grams |
| Filler | Calcium carbonate of specific gravity of about 2.74 with an average particle size of between about 17 and about 25 microns as measured at the 50% point on a sedimentation curve. Not over 35% by weight remaining on a 270 mesh screen having an opening of 53 microns. | 3600 grams |
| Surfactant | Ethoxylated alkyphenol (Igepal ® surfactant GAF Corporation) | 56 grams |
| Suspending Agent | Fumed silica (Aerosil ® 200 Degussa) | 60 grams |
| Colorant | Red pigment (P.D.I. 1501 Pigment Dispersions Inc.) | 10 grams |

The face fill coating was applied to a continuous polyester material of 17 pounds per ream weight as set forth above by a knife at a rate of about 11 pounds per ream in a continuous coating and electron beam curing device such as illustrated in the above-referenced application U.S. Pat. No. 4,345,545. The layer is partially cured to a nontacky state at about 300 kilovolts at a speed of about 20 feet per minute for a megarad dose of 0.8 megarads.

After the face fill was partially cured, the cloth was repositioned for application of a back fill coat. The back filled coat had a radiation curable resin system coating as follows:

| CLASS | COMPOSITION | AMOUNT |
|---|---|---|
| Oligomer | Diacrylate ester of a biphenol A type epoxy resin (Celrad ® 3600 Celanese Chemical Co.) | 2000 grams |
| Diluent | N—vinyl-2-pyrrolidone | 2000 grams |
| | Trimethylolpropane triacrylate (TMPTA) | 780 grams |
| Filler | Calcium carbonate (same as in face fill) | 5000 grams |
| Surfactant | FC-430 (Fluorocarbon from 3M Company) | 10 grams |
| Colorants | Brown (PDI 1705) | 500 grams |
| | Black (PDI 1800) from Pigment Dispersions Inc. | 50 grams |
| Suspending Agent | Fumed siica, Aerosil ® 200 average primary particle size 12 millimicron | 100 grams |

This resin system was roll coated by direct roll application onto the back of the previously face filled roll. The application rate was at a rate of about 5 pounds per ream. The coating was then cured at 300 kilovolts at a speed of 20 feet per minute for an exposure of about 0.8 megarads. After curing, the back and face coated cloth was removed and again replaced in the device as the dispensing roll.

A make coat was prepared for application to the prepared backing material. The make coat has the following composition:

| CLASS | COMPOSITION | AMOUNT |
|---|---|---|
| Oligomer | Acrylated epoxy resin (Celrad ® 3500 - Celanese Chemical Co.) | 5530 grams |
| Diluents | N—vinyl-2-pyrrolidone | 1273 grams |
| | Isobornyl acrylate available from Rohm and Haas Company as Monomer QM-589 | 1661 grams |
| | Acrylic acid | 288 grams |
| Filler | Calcium carbonate (same composition as in the face fill coat) | 4000 grams |
| Surfactant | FC-430 fluorocarbon | 10 grams |
| Suspending Agent | Aerosil ® 200 | 150 grams |
| Colorants | Red pigment (P.D.I. 1501 Dispersions, Inc.) | 270 grams |

The make coat was applied at a rate of about 15.7 pound per ream at an application speed of about 20 feet per minute. Abrasive grain was applied at a rate of about 72 pounds per ream using alumina grain of particle size 36 grit. The curing was carried out at 500 kilovolts to give a treatment of about 5 megarads. Cure was carried out by electron beam through the backing rather than directly onto the grain. The backing having the make coat and abrasive grain thereon was removed and placed in position for application of the size coat.

The size coat of the following composition was prepared for application onto the make coat and grain.

| CLASS | COMPOSITION | AMOUNT |
|---|---|---|
| Oligomer | Celrad ® (further identified in the back coat listing above) | 5210 grams |
| Diluent | Isobornyl acrylate (further identified in the make coat listing above) | 1500 grams |
| | NVP (further identified in the face fill listing above) | 1500 grams |
| | TMPTA (further identified in the listing under back fill above) | 1000 grams |
| Filler | Calcium carbonate (further identified in the face fill listing above) filler | 4000 grams |
| Cutting Aid | Cryolite (95% through 325 U.S. mesh screen all through 100 U.S. mesh) | 8000 grams |
| Suspending Agent | Aerosil ® 200 | 100 grams |
| Pigment | Black pigment (Pigment Dispersion Inc. P.D.I. 1800) | 100 grams |

The size coat was cured at 500 kilovolts at a speed of approximately 20 feet per minute past the electron beam. The curing dose was about 5 megarads applied from the face side.

The abrasive material was tested and found to provide coating performance at least equal to the presently available alumina abrasive formed on the same polyester backing material.

EXAMPLE 2

The polyester backing material having a face fill and back fill coat as formed in Example 1 is utilized to form a coated abrasive utilizing conventional waterproof heat curable make and size coats. The make coat is of the composition:

| CLASS | COMPOSITION | AMOUNT |
|---|---|---|
| Phenolic Resin | Phenol-formaldehyde resole 550 cps. at 70% solids | 10,000 grams |
| Filler | Calcium carbonate (same as Example 1) | 10,000 grams |

The size coat of a conventional heat curing resin:

| CLASS | COMPOSITION | AMOUNT |
|---|---|---|
| Phenolic Resin | Phenol-formaldehyde resole 500 cps. at 70% solids | 8100 grams |
| Cutting Aid | Cryolite (same as Example 1) | 9900 grams |
| Pigment | Carbon black dispersion | 100 grams |

This product exhibited good coated abrasive properties, comparable with the conventional products.

EXAMPLE 3

The process of Example 1 was repeated except that the back fill coat was formed utilizing a conventional heat curable acrylic latex resin formed of 70 parts of heat curable latex (Rohm & Haas AC 604 - 46% latex solids) and 30 parts calcium carbonate (same composition as Example 1).

The product was a satisfactory coated abrasive with good cutting and life properties.

EXAMPLE 4

The process of Example 1 was repeated except that a heat curing size coat of the phenolic resin composition below was substituted for the electron beam curable size coat of Example 1.

| CLASS | COMPOSITION | AMOUNT |
|---|---|---|
| Phenolic Resin | Phenol-formaldehyde resole 500 cps. at 70% solids | 10,000 grams |
| Filler | Calcium carbonate (same as Example 1) | 10,000 grams |

A satisfactory coated abrasive was produced.

EXAMPLE 5

The method of Example 1 was repeated except that a heat curing size coat composition as below was substituted for the electron beam curing size coat of Example 1.

| CLASS | COMPOSITION | AMOUNT |
|---|---|---|
| Phenolic Resin | Phenol-formaldehyde resole 500 cps. at 70% solids | 8100 grams |
| Cutting Aid | Cryolite (same as Example 1) | 9900 grams |
| Pigment | Carbon black dispersion | 100 grams |

A satisfactory coated abrasive material was produced.

The final product was a satisfactory coated abrasive product having good cutting and life properties.

EXAMPLE 6

The method of Example 2 was repeated except that a hybrid resin composition as set forth below was substituted for the face fill of Example 2.

| CLASS | COMPOSITION | AMOUNT |
|---|---|---|
| Oligomers | Acrylated epoxy resin (Celrad ® 3703, Celanese Plastics & Specialities Co.) | 2000 grams |
| | Acrylated epoxy novolac resin with 20% TTEGDA (Celrad ® 3801-20G, Celanese Plastics & Specialities Co.) | 1180 grams |
| Resin | Phenolic resole resin (CR-3575, Clark Chemical Co.) | 4600 grams |
| Diluents | N—vinyl-2-pyrrolidone (V—Pyrol/ RC, GAF Corporation) | 1060 grams |
| | Tetraethylene glycol diacrylate (TTEGDA) | 200 grams |
| Filler | Calcium carbonate (Gold Bond ® Superfine Pulverized #7 Limestone, National Gypsum Co.) | 9400 grams |
| Surfactants | FC-430 (Fluorad ®, 3M Company) | 5 grams |
| | Modaflow ® (Monsanto Company) | 5 grams |
| | W-980 BYK (Mallinckrodt) | 30 grams |
| Colorant | Brown pigment (PDI-1705, Pigment Dispersions Inc.) | 160 grams |

The face fill was cured at 500 kilovolts at a speed of approximately 20 feet per minute past the electron beam. The curing was about 4 megarads applied from the face side. The resultant partially cured product was slightly tacky to the touch, but could be further processed or stored without added curing steps. The uncured phenolic portion of the face fill was completely cured after heat curing of the make coat.

The final product was a satisfactory coated abrasive product with good cutting and life properties.

EXAMPLE 7

The method of Example 2 was repeated except that a hybrid resin composition as set forth below was substituted for make coat of Example 2.

| CLASS | COMPOSITION | AMOUNT |
|---|---|---|
| Oligomers | Acrylated epoxy resin (Celrad ® 3703 Celanese Plastics & Specialities Co.) | 2000 grams |
| | Acrylated epoxy novolac resin with 20% TTEGDA (Celrad ® 3801-20G, Celanese Plastics & Specialities Co.) | 1180 grams |
| Resin | Phenolic resole resin (CR-3575, Clark Chemical Co.) | 3400 grams |
| Diluents | N—vinyl-2-pyrrolidone (V—Pyrol/ RC, GAF Corporation) | 1060 grams |
| | Tetraethylene glycol diacrylate (TTEGDA) | 200 grams |
| Filler | Calcium Carbonate (Gold Bond ® Superfine Pulverized #7 Limestone, National Gypsum Co.) | 2400 grams |
| Surfactants | FC-430 (Fluorad ®, 3M Company) | 5 grams |
| | Modaflow ® (Monsanto Company) | 5 grams |
| | W-980 BYK (Mallinckrodt) | 15 grams |
| Colorant | Black pigment (PDI - 1800, Pigment Dispersions, Inc.) | 50 grams |

The coating was cured as in Example 6. The resultant partially cured product, although slightly tacky to the touch, was useful in further immediate processing steps, or acceptable for storage, without further curing. Otherwise, the product exhibited normal and acceptable coated adhesive properties.

It is understood that the above-described embodiments are simply illustrative of the invention and that many other embodiments can be devised without departing from the spirit and scope of the invention. For instance, the amount of the electron radiation curing resins applied to the coated abrasive material may be changed depending on the backing material and intended use of the abrasive. Further, while the invention has been illustrated with specific acrylated-urethane and acrylated epoxy resins as the oligomers, there are numerous other acrylated epoxies and electron beam curing acrylated-urethanes which could be utilized in the instant invention. Further, while the diluents have been illustrated as an acrylate of specific composition, there are other acrylates which could be utilized if desired to give polymers of different hardness. Although, the resin systems of the invention have been found to be particularly suitable for use in combination with each other, the systems of the invention may be utilized in combination with conventionally cured coatings or with other electron beam cured coatings. Further, other additives could be inserted into the system without detrimentally affecting the invention. For instance, viscosity controlling agents, anti-foaming agents or other colorants could be utilized. Further, it would be within the scope of the invention to, in the insrance of a base other than polyester, utilize adhesion promoters with a particular substrate in the face, size and backing layers such as silanes materials to promote the adhesion to fiberglass backings.

While the invention has been described with specific embodiments, there are modifications that may be made without departing from the spirit of the invention. For instance, the method of coating could be changed to coat all layers as transfer roll or doctor roll. Further, another change within the invention would be to cure the coatings from either the wet resin side or application of the electron beam through the backing to cure the resin. Further, while the cloth treatment steps have been specifically illustrated by the use of the cloth material in coated abrasives, there are other uses of such materials such as in forming artificial leathers, waterproof fabrics for tents and boats and filled fabrics that are utilized for vapor barriers. The scope of the invention is not to be limited by specific illustrations, but is defined by the claims.

What is claimed is:

1. A coated abrasive wherein at least one layer is comprised of a mixture of an electron radiation curable resin system comprising an oligomer, filler and a diluent wherein the electron-curable resin is selected from urethane-acrylates or epoxy acrylates and a heat curable resin system wherein the heat curable resin is selected from phenolic resins, melamine resins, amino resins, alkyd resins and furan resins.

2. The coated abrasive of claim 1 wherein the heat curable resin system is comprised of phenolic resin.

3. The coated abrasive of claim 2 wherein the phenolic resin is a resole resin.

4. The coated abrasive of claim 1 wherein the mixture contains up to about 50% by weight heat curable resin.

5. The coated abrasive of claim 1 wherein the mixture contains from about 25 to about 45% by weight phenolic resin.

6. The coated abrasive of claim 1 wherein the mixture further contains a surfactant.

7. The coated abrasive of claim 1 wherein said mixture further contains a colorant.

8. The coated abrasive of claim 1 wherein said diluent is an acrylic acid derivative.

9. The coated abrasive of claim 1 wherein said diluent is a pyrrolidone derivative.

10. The coated abrasive of claim 1 wherein the backing of said coated abrasive comprises cotton cloth or waterproof paper.

11. The coated abrasive of claim 1 wherein said oligomer is an acrylated urethane.

12. The coated abrasive of claim 1 wherein the backing of said coated abrasive is a polyester cloth.

13. The method of forming a coated abrasive product comprising the steps of:
    (a) coating a fibrous substrate with a plurality of successive layers of resin, at least one layer comprised of an electron beam curable resin, and at least one layer comprised of a heat curable resin; and
    (b) applying at least one intermediate layer of particulate abrasive material.

14. The method of claim 13 wherein the electron beam curable resin is selected from the group of urethane-acrylate resins, epoxy-acrylate resins, or mixtures thereof.

15. The method of claim 14 wherein the electron beam resin is an epoxy-acrylate resin.

16. The method of claim 13 wherein the heat curable resin is a phenolic resin.

17. The method of claim 13 wherein at least one layer consists of a mixture of electron beam curable and heat curable resin.

18. The method of claim 17 wherein the electron beam curable resin is an epoxy-acrylate resin.

19. The method of claim 18 wherein the heat curable resin is a phenolic resin.

* * * * *